Dec. 10, 1963 R. L. ATKINSON 3,113,815
BEARING ASSEMBLIES
Original Filed Nov. 12, 1959 3 Sheets-Sheet 1

Inventor:
RICHARD LESLIE ATKINSON

By E. M. Squire
Attorney.

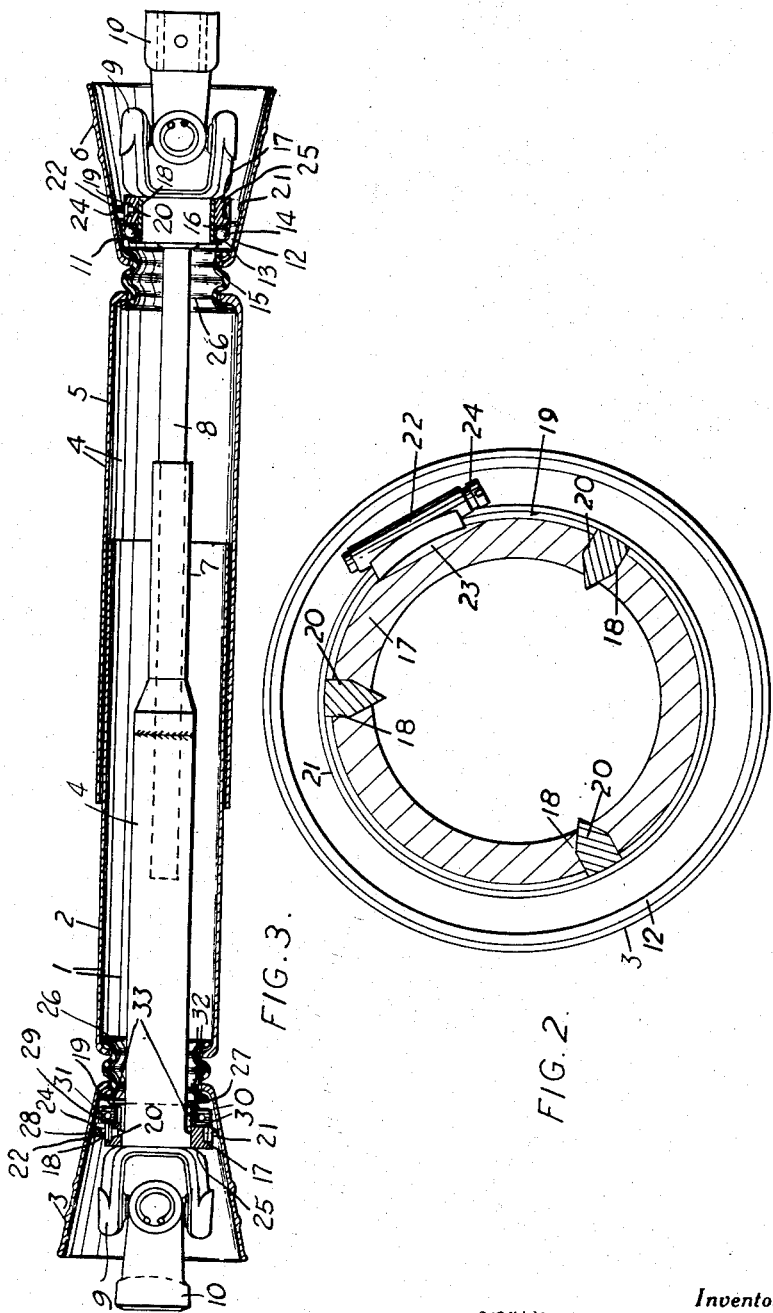

Dec. 10, 1963     R. L. ATKINSON     3,113,815

BEARING ASSEMBLIES

Original Filed Nov. 12, 1959     3 Sheets-Sheet 3

Inventor:
RICHARD LESLIE ATKINSON

By E. M. Squire

Attorney.

United States Patent Office 3,113,815
Patented Dec. 10, 1963

3,113,815
BEARING ASSEMBLIES
Richard L. Atkinson, Bolton-by-Bowland, near Clitheroe, England, assignor to Atkinson's Agricultural Appliances Limited, Clitheroe, Lancashire, England, a British company
Original application Nov. 12, 1959, Ser. No. 852,457, now Patent No. 3,044,279, dated July 17, 1962. Divided and this application May 15, 1962, Ser. No. 195,366
Claims priority, application Great Britain Dec. 8, 1958
8 Claims. (Cl. 308—236)

This invention relates to bearing assemblies.

An object of the present invention is to provide a bearing assembly comprising a bearing having an outer annular member and an inner annular member rotatable about and co-axial with said outer annular member, at least one of said members having a clamp co-axially attached to it, suitable for clamping it to an article to be associated with the bearing assembly. The annular members may constitute the outer and inner races of a ball bearing which may be either a journal or a thrust type of bearing. In order to avoid the need for lubrication, certain of the bearing components may be made of a thermo-setting resin, or a long-chain synthetic polymeric amide and of a construction, all as hereinafter described in detail.

This application is a division of my copending application Serial No. 852,457, filed on November 12, 1959, now Patent No. 3,044,279, issued on July 17, 1962.

According to the present invention I provide a bearing assembly comprising an inner ring, an outer ring co-axial with said inner ring, anti-friction means disposed between said rings and enabling relative rotation therebetween, an annular member co-axial with said rings and located in axial continuity therewith, means rendering said inner ring and said annular member integral with one another, said annular member being inwardly movable at least at circumferentially spaced portions thereof thus effectively to constrict same in diameter, said annular member having a circumferential groove, a circumferentially adjustable collar seated in said groove and adapted on circumferential length adjustment to affect the effective diameter of said annular member, and means for reducing the circumferential length of the collar thus effectively to constrict the diameter of said annular member for the purpose of clamping same to a shaft member about which the bearing assembly is to be mounted.

Bearing assemblies according to the invention are suitable for fitting to shafts which have got specially machined surfaces for the fitting of the inner race of ordinary ball bearings; the invention is therefore particularly suitable for providing shafts of existing machinery with safety guards.

Two preferred embodiments of the invention will now be described with reference to the accompanying drawings in which:

FIG. 2 is an enlarged section on AA in FIG. 1;

FIG. 3 is an axial section through an alternative construction of a shaft envelope assembly, also showing an alternative construction of a thrust bearing; in FIG. 3 the clamps are omitted; and FIGS. 4, 5 and 6 are axial sections, illustrating on a larger scale the bearings shown, respectively, in FIG. 1, at the left-hand side in FIG. 3, and at the right-hand side in FIG. 3.

Figure 1:
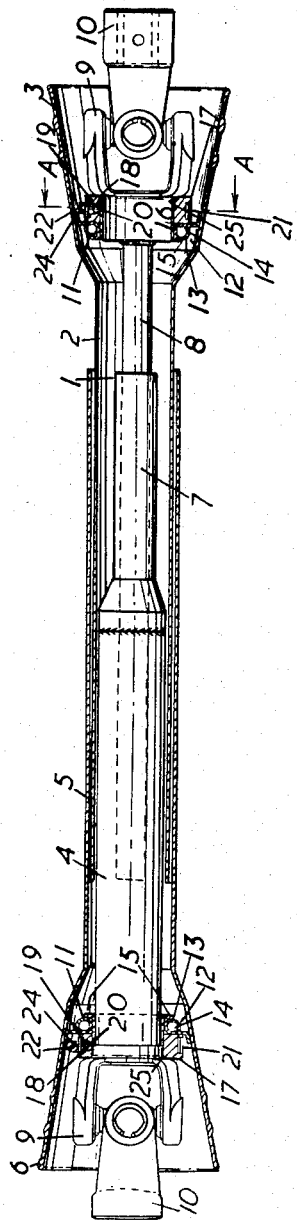
FIG. 1 is an axial section through a telescopic shaft coupling embodying the invention.

Referring to FIG. 1, 1 is a polythene tube of circular cross-section and bore, having a portion of uniform cross-section 2 and a flared frustro-conoidal end portion 3. 4 is a second tube, identical in all respects with tube 1, except that its portion of uniform cross-section 5 is of larger bore than that of portion 2 of tube 1, its bore being such that portion 2 forms a freely sliding fit therein.

It has a frustro-conoidal end portion 6.

The shaft envelope assembly formed by the telescoped tubes 1 and 2 surrounds a shaft coupling consisting of a telescopic shaft having shaft members 7 and 8, each shaft member terminating in a universal joint 9. A stub-shaft 10 is connected to the free end of each universal joint 9.

As shown to a larger scale in FIG. 4, 11 are thrust bearings, each having a steel outer ring 12, a steel inner ring 13 and a number of balls 14 retained between said rings. The balls are either of a phenolformaldehyde resin, known generally as "Bakelite" (registered trademark) or of nylon. Alternatively the balls 14 may be replaced by a nylon ring of circular cross-section. The inner ring 13 has four circumferentially spaced pads 15 which, before assembly of the bearing, extend axially and which, upon assembly, are peened over the edge of the outer ring 12 as shown, to locate the inner ring relative to the outer ring.

The outer ring 12 of the bearing is riveted to the inside wall of portion 3, and that of the other bearing to the inside wall of portion 6.

Referring particularly to FIGS. 2 and 4, the inner ring 13 of each bearing has welded to it along its annular face 16 a steel annular member 17, thus to render the inner ring 13 and the annular member 17 integral with one another, the member 17 having three equally spaced radial holes 18 and a circumferential groove 19 linking said radial holes.

Alternatively, the member 17 may be made of rubber and bonded to the inner ring 13. Each hole is tapered at its inner end and permits a cylindrical hardened steel peg 20, pointed at one end, inserted in each hole 18, to penetrate the member 17 inwardly, to a limited extent. An adjustable circumferential steel collar 21 having a screw adjusting mechanism 22 is accommodated in the groove 19, the screw adjusting mechanism 22 being accommodated on a flattened cut-away portion 23 on the outer curved surface of the member 17, whereby the collar 21 is prevented from turning relative to the member 17. The portions 3 and 6 each have a hole, closable by a rubber grommet or plug (not shown) opposite the head of the screw 24, to permit insertion of a screw driver for the purpose of adjusting the collar 21.

To fit a shaft envelope assembly having bearing assemblies according to the invention, over a telescopic shaft coupling between a tractor and an implement, the tractor and the implement are connected and the telescopic shaft is fitted to the implement. The male section 8 of the shaft is withdrawn and the shaft envelope assembly is fitted over the female section of the shaft. The male section of the shaft is re-connected and the shaft is coupled to the tractor power-take-off. The end portions 3 and 6 are pulled apart until the annular members 17 abut the shoulders 25 of the universal joints 9. The screws 24 are then turned until the points on the pegs 20 bed into the surfaces of the shaft members 7 and 8 whereby the inner ring 13 of each thrust bearing 11 is securely attached to its respective shaft member. Finally the holes in the end portions 3 and 6 are plugged up by the rubber grommets or plugs.

Referring to FIGS. 3, 5 and 6, the tubes 1 and 4 each have a convolute rubber hose 26 connecting their portions of uniform cross-section 2 and 5 to their first flared frustro-conoidal end portions 3 and 6 respectively, whereby additional relative axial movement between the end portions 3 and 6 is made possible.

The thrust bearing 27, shown fitted to tube 1, in FIGS. 3 and 5, has a steel outer ring 28, a steel inner ring 29, two annular nylon washers 30 and a number of nylon balls 31 contained in a nylon cage 32. The inner ring 29 has four circumferentially spaced pads 33 which, before assembly of the bearing, extend axially and which, upon assembly, are peened over the edge of the outer ring 28 as shown, to locate the inner ring relative to the outer ring.

The thrust bearing shown fitted to tube 3, in FIGS. 3 and 5, may include a rubber annular member 35, as shown in FIG. 6, which is bonded to the annular face 16 of the inner ring 13, and an adjustable steel collar 36 located in a circumferential groove 37 in the outer peripheral surface of the rubber member 35, the collar 36 being contracted by tightening of the screw 38, whereby the rubber member 35 is securely fastened in position around the hub 39 of the yoke 40 of the universal joint and the inner ring 13 of the thrust bearing is securely attached to the yoke 40, i.e. relative to the shaft member 8.

In all other respects the shaft envelope assemblies shown in FIGS. 1 and 3 are identical and like reference numerals refer to like parts in all of the figures. It should also be understood that in actual practice the bearings used in both tubes would normally be identical and that the different bearings shown in the end portions 3 and 6 in FIG. 3 are for purposes of illustration only.

I claim:

1. A bearing assembly comprising an inner ring, an outer ring co-axial with said inner ring, anti-friction means disposed between said rings and enabling relative rotation therebetween, an annular member co-axial with said rings and located in axial continuity therewith, said annular member having inner and outer circumferential faces, means rendering said inner ring and said annular member integral with one another, said annular member having radially-extending through openings at circumferentially spaced portions thereof extending between its said inner and outer circumferential faces and also having in its said outer circumferential face a circumferential groove into which said through openings extend, said through openings tapering over at least part of their lengths in the direction of and into said inner circumferential face of said annular member, a collar seated in said groove, said collar having an inner circumferential face, means inhibiting rotation of said collar relative to said annular member, means enabling circumferential length adjustment of said collar, radially and inwardly directed pegs extending from said inside circumferential face of said collar and into said through openings, said pegs being pointed at their inwardly-directed ends, whereby, on circumferential length adjustment of said collar, said pegs are constained to move radially inwards and penetrate the inner circumferential face of said annular member, and means for reducing the circumferential length of said collar thus to move said pegs radially inwards for the purpose of bedding the points thereof into the surface of a shaft member about which the bearing assembly is to be mounted.

2. A bearing assembly as claimed in claim 1, wherein the inner and outer rings constitute the inner and outer races of a ball bearing.

3. A bearing assembly as claimed in claim 2, wherein the ball bearing is a thrust bearing.

4. A bearing assembly as claimed in claim 1, wherein the balls are of nylon.

5. A bearing assembly comprising an inner race, an outer race co-axial with said inner race, balls disposed between said races and enabling relative rotation therebetween, said balls being fabricated from a member of the group comprising thermosetting resins and long-chain synthetic polymeric amides, an annular member co-axial with said races and located in axial continuity therewith, said annular member having inner and outer circumferential faces, means rendering said inner race and said annular member integral with one another, said annular member having radially-extending through openings at circumferentially spaced portions thereof extending between its said inner and outer circumferential faces and also having in its said outer circumferential face a circumferential groove into which said through openings extend, said through openings tapering over at least part of their lengths in the direction of and into said inner circumferential face of said annular member, a collar seated in said groove, said collar having an inner circumferential face, means inhibiting rotation of said collar relative to said annular member, means enabling circumferential length adjustment of said collar, radially and inwardly directed pegs extending from said inside circumferential face of said collar and into said through openings, said pegs being pointed at their inwardly-directed ends, whereby, on circumferential length adjustment of said collar, said pegs are constrained to move radially inwards and penetrate the inner circumferential face of said annular member, and means for reducing the circumferential length of said collar thus to move said pegs radially inwards for the purpose of bedding the points thereof into the surface of a shaft member about which the bearing assembly is to be mounted.

6. The combination in a bearing assembly of a bearing comprising an inner metal ring, an outer metal ring co-axial with said inner ring, a pair of nylon washers mounted in spaced-apart relationship between said inner and outer rings, a nylon cage mounted between said washers and a series of nylon balls in said cage; and an annular member co-axial with said rings and located in axial continuity therewith, said annular member having inner and outer circumferential faces, means rendering said inner ring and said annular member integral with one another, said annular member having radially-extending through openings at circumferentially spaced portions thereof extending between its said inner and outer circumferential faces and also having in its said outer circumferential face a circumferential groove into which said through openings extend, said through openings tapering over at least part of their lengths in the direction of and into said inner circumferential face of said annular member, a collar seated in said groove, said collar having an inner circumferential face, means inhibiting rotation of said collar relative to said annular member, means enabling circumferential length adjustment of said collar, radially and inwardly directed pegs extending from said inside circumferential face of said collar and into said through openings, said pegs being pointed at their inwardly-directed ends, whereby, on circumferential length adjustment of said collar, said pegs are constrained to move radially inwards and penetrate the inner circumferential face of said annular member, and means for reducing the circumferential length of said collar thus to move said pegs radially inwards for the purpose of bedding the points thereof into the surface of a shaft member about which the bearing assembly is to be mounted.

7. A bearing assembly comprising an inner metal race, an outer metal race co-axial with said inner race, nylon balls disposed between said rings and enabling relative rotation therebetween, an annular member of metal co-axial with said races and located in axial continuity and welded to said inner race, said annular member having inner and outer circumferential faces, said annular member having radially-extending through openings at circumferentially spaced portions thereof extending between its said inner and outer circumferential faces and also having in its said outer circumferential face a circumferential groove into which said through openings extend, said through openings tapering over at least part of their lengths in the direction of and into said inner circumferential face of said annular member, a collar seated in said groove, said collar having an inner circumferential face, means inhibiting rotation of said collar relative to said annular member, means enabling circumferential length adjustment of said collar, radially and inwardly directed pegs extending from said inside circumferential face of said collar and into said through openings, said pegs being pointed at their inwardly-directed ends, whereby, on circumferential length adjustment of said collar, said pegs are constrained to move radially inwards and penetrate the inner circumferential face of said annular member, and means for reducing the circumferential length of said collar thus to move said pegs radially inwards for the purpose of bedding the points thereof into the surface of a shaft member about which the bearing assembly is to be mounted.

8. A bearing assembly comprising an inner ring, an outer ring co-axial with said inner ring, anti-friction means disposed between said rings and enabling relative rotation therebetween, an annular member co-axial with said rings and located in axial continuity therewith, said annular member having inner and outer circumferential faces, means rendering said inner ring and said annular member integral with one another, said annular member having radially-extending through openings at circumferentially spaced portions thereof extending between its said inner and outer circumferential faces and also having in its said outer circumferential face a circumferential groove into which said through openings extend, said through openings tapering over at least part of their lengths in the direction of and into said inner circumferential face of said annular member, a collar seated in said groove, said collar having an inner circumferential face, said annular member having a flat portion in its said outer circumferential face, screw-adjusting mechanism enabling circumferential length adjustment of said collar and bearing on said flat portion thus to inhibit rotation of said collar relative to said annular member, radially and inwardly directed pegs extending from said inside circumferential face of said collar and into said through openings, said pegs being pointed at their inwardly-directed ends, whereby, on circumferential length adjustment of said collar, said pegs are constrained to move radially inwards and penetrate the inner circumferential face of said annular member, and means for reducing the circumferential length of said collar thus to move said pegs radially inwards for the purpose of bedding the points thereof into the surface of a shaft member about which the bearing asembly is to be mounted.

References Cited in the file of this patent
UNITED STATES PATENTS

| | | |
|---|---|---|
| 2,166,391 | Borland | July 18, 1939 |
| 2,168,469 | Brouwer | Aug. 8, 1939 |
| 2,785,023 | Naumann | Mar. 12, 1957 |
| 2,856,246 | Gaubatz | Oct. 14, 1958 |
| 2,911,268 | Staunt | Nov. 3, 1959 |
| 2,995,405 | Ferdig | Aug. 8, 1961 |